US009571671B2

(12) United States Patent
Matsumoto

(10) Patent No.: US 9,571,671 B2
(45) Date of Patent: Feb. 14, 2017

(54) MANAGEMENT DEVICE, CONTROL METHOD, AND RECORDING MEDIUM

(71) Applicant: CANON KABUSHIKI KAISHA, Tokyo (JP)

(72) Inventor: Tetsuya Matsumoto, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 13/966,673

(22) Filed: Aug. 14, 2013

(65) Prior Publication Data

US 2014/0055800 A1 Feb. 27, 2014

(30) Foreign Application Priority Data

Aug. 27, 2012 (JP) ................................ 2012-186787

(51) Int. Cl.
*G06F 3/12* (2006.01)
*H04N 1/00* (2006.01)

(52) U.S. Cl.
CPC ......... *H04N 1/00042* (2013.01); *G06F 3/1211* (2013.01); *G06F 3/1221* (2013.01); *G06F 3/1229* (2013.01); *G06F 3/1285* (2013.01); *G06F 3/1294* (2013.01); *H04N 1/00244* (2013.01); *H04N 1/00344* (2013.01); *H04N 1/00896* (2013.01); *H04N 2201/0039* (2013.01); *H04N 2201/0072* (2013.01); *H04N 2201/0082* (2013.01); *H04N 2201/0094* (2013.01); *Y02B 60/1271* (2013.01)

(58) Field of Classification Search
USPC ........................................................ 358/1.15
See application file for complete search history.

(56) References Cited

U.S. PATENT DOCUMENTS

| | | | | |
|---|---|---|---|---|
| 8,446,618 | B2 | 5/2013 | Mukaiyama et al. | 358/1.15 |
| 2004/0218204 | A1* | 11/2004 | Nomura | H04L 67/02 358/1.14 |
| 2006/0221863 | A1* | 10/2006 | Ishimoto et al. | 370/254 |
| 2011/0235108 | A1* | 9/2011 | Kato | 358/1.15 |
| 2012/0062946 | A1* | 3/2012 | Kitagata | 358/1.15 |
| 2012/0137087 | A1* | 5/2012 | Umimura | 711/154 |
| 2013/0057910 | A1 | 3/2013 | Matsumoto | 358/1.15 |

FOREIGN PATENT DOCUMENTS

| | | |
|---|---|---|
| JP | H07-334462 | 12/1995 |
| JP | 2004-227529 | 8/2004 |
| JP | 2007-293471 | 11/2007 |
| JP | 2008-257632 | 10/2008 |
| JP | 2009-134584 A | 6/2009 |

OTHER PUBLICATIONS

JPO Office Action issued on Sep. 20, 2016 in Japanese patent application 2012-186787, with translation.

* cited by examiner

*Primary Examiner* — Huo Long Chen
(74) *Attorney, Agent, or Firm* — Fitzpatrick, Cella, Harper & Scinto

(57) ABSTRACT

A management device transmits a response confirmation request to multiple image forming devices, receives a response from any one of the multiple image forming devices, and acquires data indicating an operational status of an image forming device by requesting the pertinent data from an image forming device that has issued a response.

11 Claims, 14 Drawing Sheets

FIG. 7

| Device ID (701) | Device name (702) | IP address (703) | Model (704) | Power status notification function (705) | Maximum job log retention number (706) | Hard disk (707) | Data collection subject (708) | Data acquisition status (709) |
|---|---|---|---|---|---|---|---|---|
| 101 | MFP001 | 192.168.10.20 | Model 100 | Yes | 10000 | Installed | Subject | Response confirmation standby |
| 102 | MFP002 | 192.168.10.21 | Model 100 | Yes | 10000 | Installed | Subject | Data acquisition standby |
| 103 | MFP003 | 192.168.10.22 | Model 100 | Yes | 10000 | Installed | Not a subject | — |
| 104 | MFP004 | 192.168.10.23 | Model 300 | No | 10000 | Installed | Subject | Data acquisition in progress |
| 105 | SFP001 | 192.168.10.24 | Model 70 | Yes | 500 | Installed | Subject | Data acquisition complete |
| 106 | SFP002 | 192.168.10.25 | Model 50 | No | 50 | Not installed | Subject | Data acquisition complete |

| Device ID | Date and time | Power status |
|---|---|---|
| 101 | 2012/5/26 14:30:30 | Standby mode |
| 102 | 2012/5/26 12:01:04 | Standby mode |
| 103 | 2012/5/26 14:32:32 | Power conservation mode |
| 105 | 2012/5/25 21:59:12 | Power off |

| Job log ID | Device ID | Job type | Start date and time | End date and time | User name |
|---|---|---|---|---|---|
| 1000 | 101 | Print | 2012/5/25 14:25:30 | 2012/5/25 14:40:30 | UserA |
| 1001 | 101 | Print | 2012/5/26 09:01:00 | 2012/5/26 09:01:20 | UserB |
| 1002 | 101 | Copy | 2012/5/26 09:10:00 | 2012/5/26 09:10:30 | UserA |
| 1003 | 103 | Print | 2012/5/26 10:12:30 | 2012/5/26 10:13:00 | UserC |

MANAGEMENT DEVICE, CONTROL METHOD, AND RECORDING MEDIUM

BACKGROUND OF THE INVENTION

Field of the Invention

The present invention relates to a technology which periodically collects data from an image forming device.

Description of the Related Art

Management devices have previously been proposed for acquiring and managing data such as operational information of image forming devices including printers or multifunction printers. When the image forming devices managed by management devices increase, the number of management devices also must increase. Therefore, from the standpoint of cost reduction and maintenance of management devices, it would be desirable to enable management of a greater number of image forming devices by a single management device. Moreover, in recent years, image forming devices have been proposed which economize on power consumption by setting the power to a power saving mode or by turning the power off at times of non-use in order to reduce emissions of greenhouse gases such as carbon dioxide. For example, Japanese Patent Application Laid-Open No. 2009-134584 discloses a technology in which an image forming device notifies a management device immediately before a power saving function is activated, and the management device that receives the notification collects job log information of the image forming device that is the management subject. According to this technology, a management device is able to efficiently conduct data collection with respect to an image forming device provided with a power status notification function.

However, although the management device disclosed in Japanese Patent Application Laid-Open No. 2009-134584 is able to efficiently conduct data collection with respect to an image forming device that is provided with a power status notification function, it is not able to efficiently conduct data collection with respect to an image forming device that is not provided with a power status notification function. For example, when the power of an image forming device that is not provided with a power status notification function is turned off, the management device is unable to detect it. As data acquisition cannot be carried out when data acquisition is attempted with respect to an image forming device whose power has been turned off, the management device enters standby until a timeout interval has elapsed. As a result, the time required for data collection is prolonged. Furthermore, when the number of image forming devices managed by a management device increases, a long period of time is required in order for the management device to conduct data collection from all the image forming devices. That is, the data collection interval is further prolonged. When the data collection interval is prolonged, the possibility increases that data loss may occur. This is because when the data volume of an image forming device of low data retention capacity reaches a maximum data volume, old data is deleted.

SUMMARY OF THE INVENTION

The present invention provides a mechanism which enables efficient collection of data from multiple image forming devices according to statuses of the image forming devices.

The management device of one embodiment of the present invention includes a requesting unit which transmits a response confirmation request to multiple image forming devices, a receiving unit which receives a response from any of the aforementioned multiple image forming devices, and an acquisition unit which acquires data indicating an operational status of an image forming device by requesting the data to the image forming device that has provided the aforementioned response.

According to the present invention, it is possible to efficiently collect data from multiple image forming devices according to statuses of the image forming devices.

Further features of the present invention will become apparent from the following description of exemplary embodiments with reference to the attached drawings.

BRIEF DESCRIPTION OF THE DRAWINGS

FIG. 7 is a drawing which shows an exemplary table with which a device information processor is provided.

FIG. 8 is a drawing which shows an exemplary table with which a power status monitor is provided.

FIG. 9 is a drawing which shows an exemplary table with which a data collection unit is provided.

DESCRIPTION OF THE EMBODIMENTS

Embodiment 1

Description of System Configuration

Figure 1:
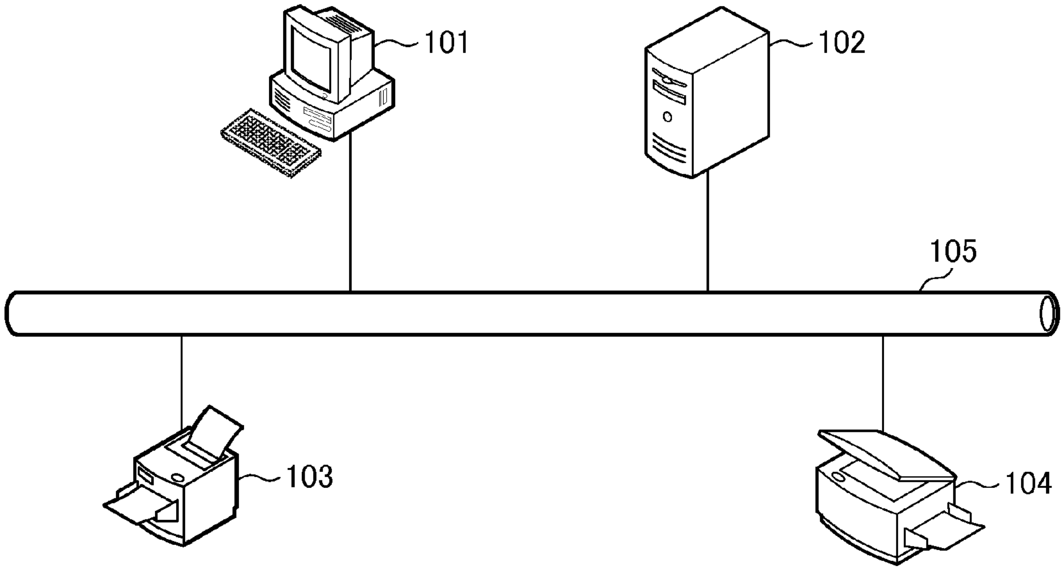
FIG. 1 is a drawing which shows an example of a management system configuration of the present embodiment.

FIG. 1 shows a configuration of a device management system which represents an embodiment of the present invention. The management system is provided with a client computer 101, a management server 102, and a printer 103 or multifunction printer 104. The client computer 101 produces print data to be used by a user, and instructs an image forming device to conduct printing. The client computer 101 is provided with below-mentioned hardware resources, and with software resources including an operating system (OS), printer driver, and the like. Furthermore, the client computer 101 is communicably connected by a prescribed protocol to an image forming device that is connected to a wired or wireless network 105.

The printer 103 accepts print data via the network, and conducts print-out to actual paper using known printing technology such as electrophotographic technology or inkjet technology. A multifunction printer (MFP) 104 accepts print data via the network, and conducts print-out to actual paper using known printing technology such as electrophotographic technology or inkjet technology. Moreover, the multifunction printer 104 possesses functions which read paper manuscripts via a scanner, conduct copying, conduct conversion to image data, and transmit the image data by email and the like. Of course, the management system of the present embodiment is applicable to printers that do not possess copy functions. The printer 103 and the multifunction printer 104 are collectively referred to as an image forming device.

The management server 102 collects data such as job logs indicating operational statuses from the printer 103 or multifunction printer 104. Note that, the client computer 101, management server 102, printer 103, and multifunction printer 104 are communicably interconnected by the network 105 by known technologies such as Ethernet®. In the present embodiment, the management server 102 is provided with a configuration that is separate from the printer 103 and the multifunction printer 104, but it is also acceptable to have the configuration of the management server 102 wherein a module with identical functions is internally provided in the printer 103 and the multifunction printer 104. In this case, the network communications conducted between the management server 102, and the printer 103 and the multifunction printer 104 may be considered as being replaced by data transfer via a system bus or the like.

<Internal Configuration of Computer>

Figure 2:
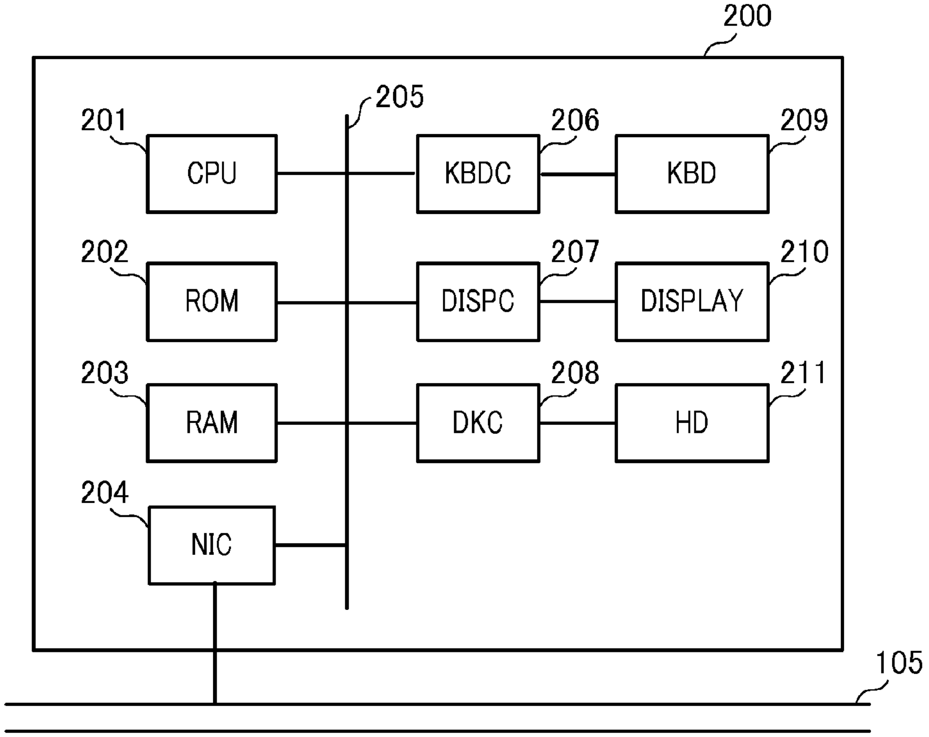
FIG. 2 shows equipment which configures a management system, and a hardware configuration of a management server.

FIG. 2 is a block diagram which shows an exemplary hardware configuration of an information processing device that functions as the management server 102. In FIG. 2, reference numeral 200 indicates the entire computer. A PC 200 is provided with a CPU (Central Processing Unit) 201 which runs software stored in, for example, a ROM (Read Only Memory) 202, or an HD 211 that serves as a large-scale memory. The CPU 201 conducts overall control of the various pieces of hardware connected to a system bus 205. A RAM (Random Access Memory) 203 functions as a main memory, a work area, or the like of the CPU 201. A network interface card (NIC) 204 conducts two-way data exchange with other nodes via the network 105. A keyboard controller (KBDC) 206 controls instructions that are input from a keyboard (KBD) 209 with which the PC is provided. A display controller (DISPC) 207 controls display of a display module (display) 210 configured, for example, with liquid crystal display. A disk controller (DKC) 208 controls a hard disk (HD) 211 that is a large-capacity memory.

<Internal Configuration of Multifunction Printer>

Figure 3:
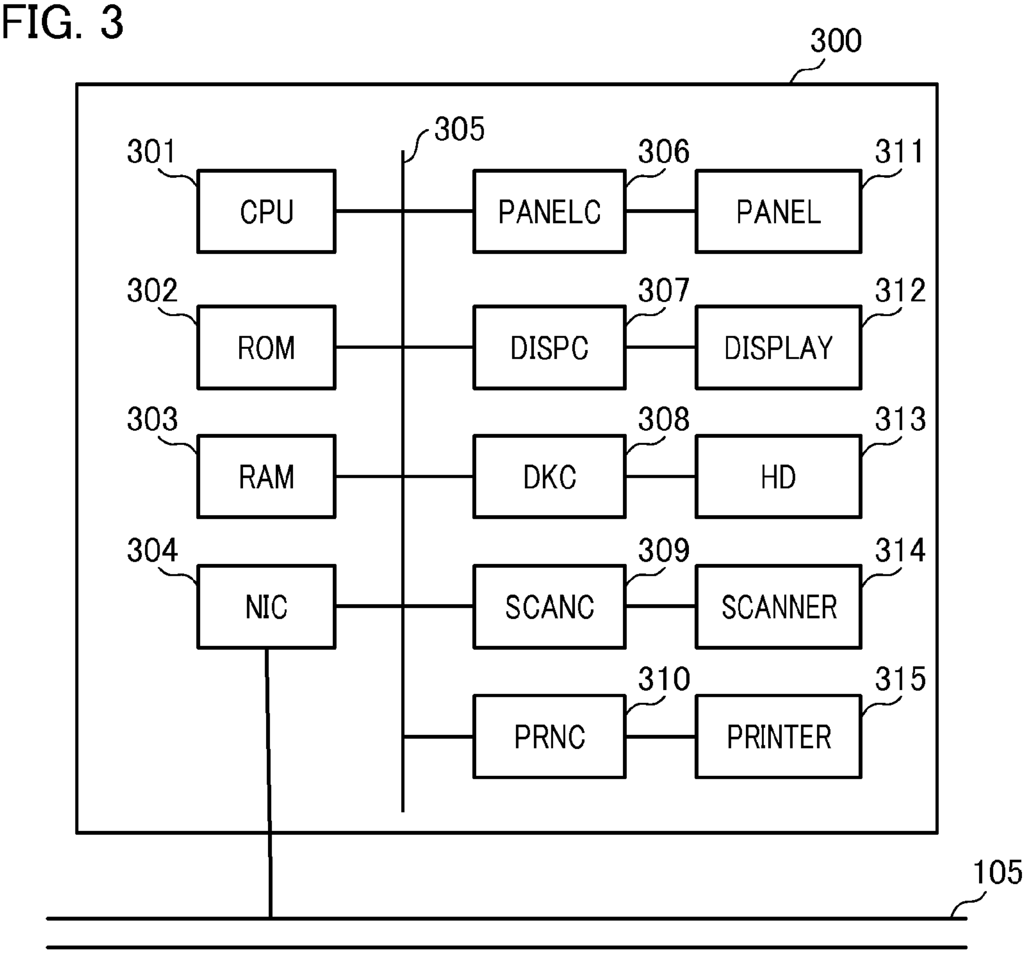
FIG. 3 shows a hardware configuration of an image forming device.

FIG. 3 is a block diagram which shows an exemplary hardware configuration of the multifunction printer 104 shown in FIG. 1. In FIG. 3, reference numeral 300 indicates the entire multifunction printer. A multifunction printer 300 is provided with a CPU 301 which runs software stored in, for example, a ROM 302, or an HD 313 that serves as a large-scale memory, and the CPU 301 conducts overall control of the various pieces of hardware that are connected to a system bus 305. A RAM 303 functions as a main memory, work area, or the like of the CPU 301. A network interface card (NIC) 304 conducts data exchange with other nodes via the network 105.

A panel controller (PANELC) 306 controls input of instructions from an operational panel (PANEL) 311 with which the multifunction printer is provided. A display controller (DISPC) 307 controls display of a display module (DISPLAY) 312 configured by, for example, a liquid crystal display. A disk controller (DKC) 308 controls the hard disk (HD) 313 that is a large-capacity memory. A scanner controller (SCANC) 309 controls an optical scanning device (scanner) 314 with which the multifunction printer is provided, and reads paper manuscripts. A printer controller (PRNC) 310 controls a printer device (printer) 315 with which the multifunction printer is provided, and conducts printing onto actual paper using known printing technology such as electrophotographic technology or inkjet technology.

The internal configuration of the printer 103 shown in FIG. 1 is identical to a configuration which removes the scanner controller 309 and the optical scanner 314 from the internal configuration of the multifunction printer 104 shown above. Furthermore, a configuration which removes the panel controller (PANELC) 306, the operational panel 311, the display controller (DISPC) 307, and the display module (DISPLAY) 312 is also acceptable. The internal configuration of the printer 103 may also be configured to remove the display controller (DKC) 308, the hard disk (HD) 313, and the like.

<Functional Configuration of Client Computer>

Figure 4:
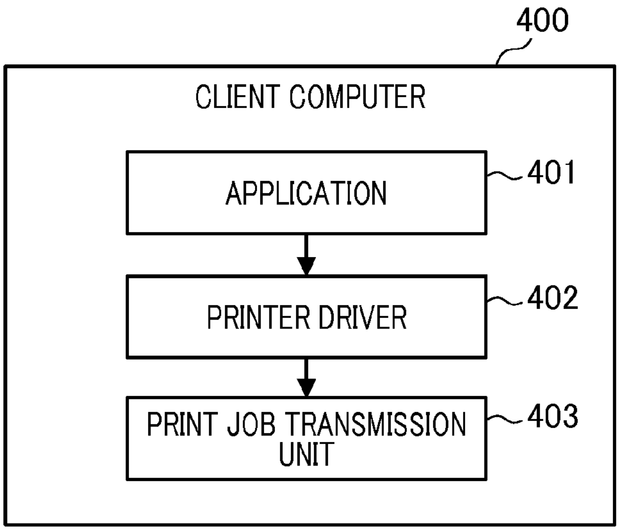
FIG. 4 is a drawing which shows a software configuration of a client computer.

FIG. 4 is a block diagram which shows an exemplary software configuration of the client computer 101 shown in FIG. 1. In FIG. 4, reference numeral 400 indicates the entire client computer. A client computer 400 is provided with an application 401, a printer driver 402, and a print job transmission unit 403. The application 401 issues print instructions by transmitting graphical commands and the like to the printer driver 402. The printer driver 402 converts graphical commands and the like received from the print application 401 to print data—i.e., PDL (Page Description Language) that can be interpreted by the multifunction printer. The printer driver 402 also prepares print jobs, and transmits them to the print job transmission unit 403. The print job transmission unit 403 transmits print jobs received from the printer driver 402 to an image forming device.

<Functional Configuration of Management Server>

Figure 5:
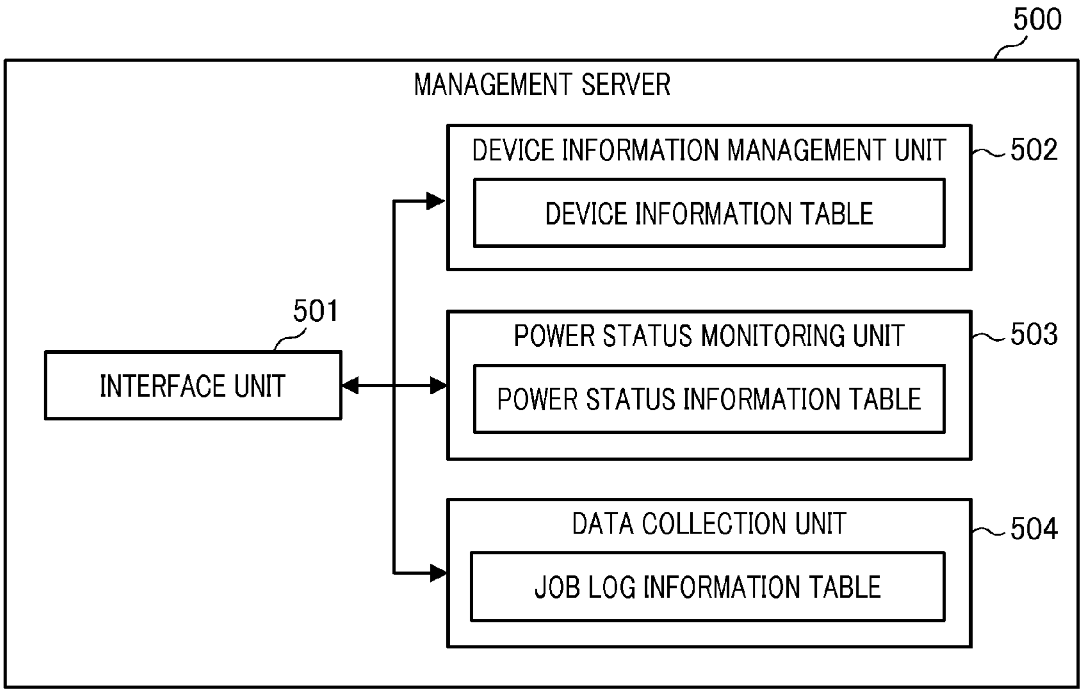
FIG. 5 is a drawing which shows a software configuration of a management server.

FIG. 5 is a block diagram which shows an exemplary software configuration of the management server 102 shown in FIG. 1. In FIG. 5, reference numeral 500 indicates the entire management server. A management server 500 is provided with an interface unit 501, a device information management unit 502, a power status monitoring unit 503, and a data collection unit 504. The interface unit 501 communicates with the client computer 101, the printer 103, and the multifunction printer 104 via the network 105 through the NIC 204 shown in FIG. 2.

The device information management unit 502 retains information relating to image forming device. The device information management unit 502 can acquire and store various types of information from the printer 103 and the multifunction printer 104 via the interface unit 501. The power status monitoring unit 503 receives and stores power status notifications from the printer 103 and the multifunction printer 104 via the interface unit 501. The data collection unit 504 periodically collects and stores data retained by the printer 103 and the multifunction printer 104 via the interface unit 501. In the present embodiment, FIG. 6 shows an example where a below-mentioned job log management unit 610 periodically collects job log information to be managed.

<Functional Configuration of Multifunction Printer>

Figure 6:
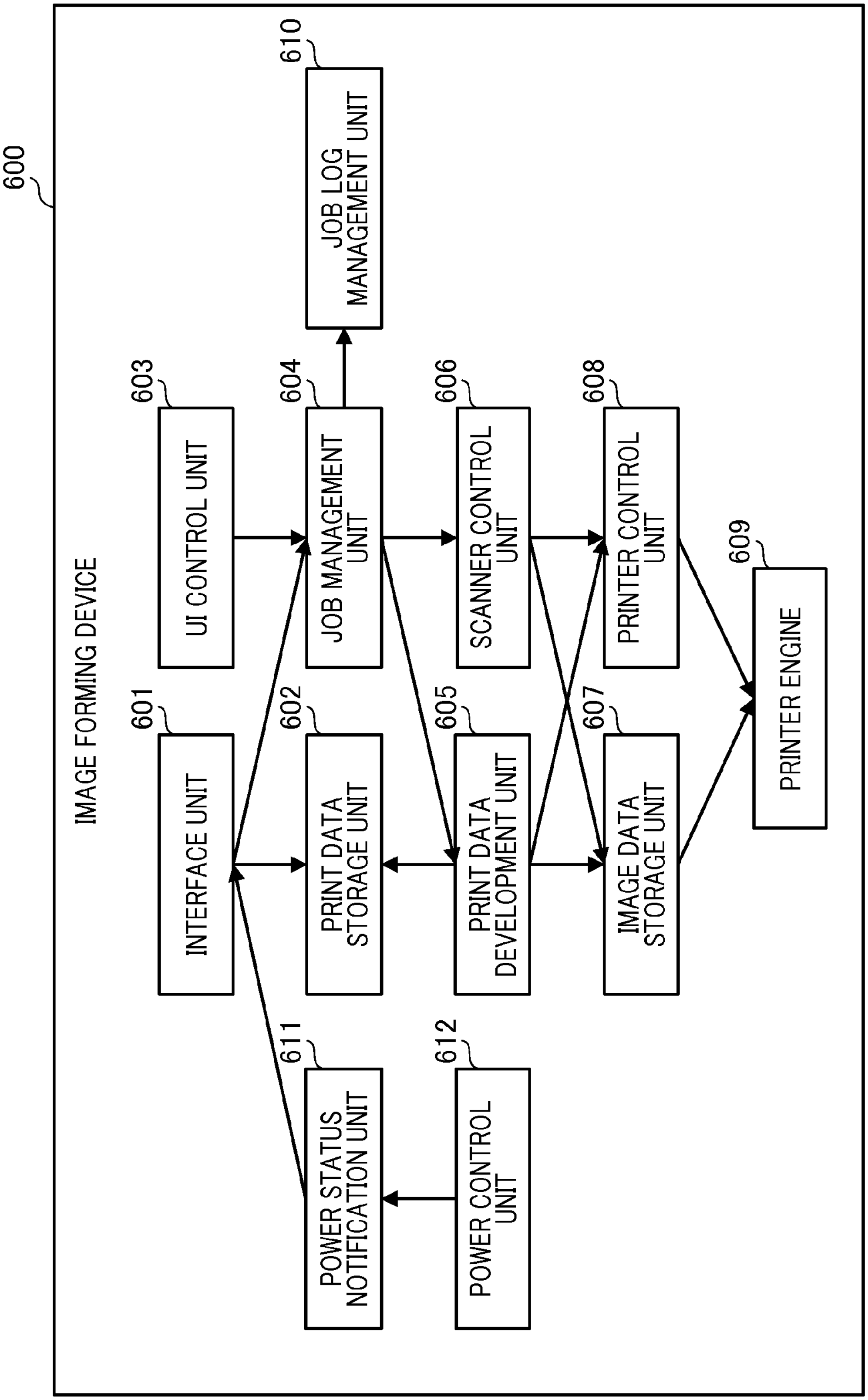
FIG. 6 is a drawing which shows an exemplary data processing configuration of an image forming device.

FIG. 6 is a block diagram which shows an exemplary data processing configuration of the image forming device shown in FIG. 1. In FIG. 6, the example of the multifunction printer 104 is adopted for purposes of describing the configuration. In FIG. 6, reference numeral 600 shows the entire image forming device. An image forming device 600 is provided with an interface unit 601, a print data storage unit 602, a UI control unit 603, a job management unit 604, a print data development unit 605, and a scanner control unit 606.

The interface unit 601 is connected to the network 105, and receives print jobs from the client computer 101. The print data storage unit 602 temporarily stores print job data. The UI control unit 603 controls the operational panel 311 via the panel controller (PANELC) 306, and accepts copy instructions and scan transmission instructions from the user addressed to the multifunction printer 104. The job management unit 604 analyzes a print job received from the client computer 101, acquires output attribution information such as user name, number of copies to be printed, and color printing, and manages it together with a job start date and time as the job information. The print data development unit 605 acquires print data from the print data storage unit 602 according to the job information stored in the job management unit 604, and generates image data in the RAM 303 by conducting image generation processing.

The scanner control unit 606 controls the scanner controller 309, conducts scanning of paper manuscripts, and prepares image data. In the case where it is possible to connect ADF, RDF, or the like as a manuscript feeding device in the scanner control unit 606, the scanner control unit 606 controls manuscript feeding and manuscript discharge from ADF or RDF. In the case where a double-sided manuscript is to be read, the scanner control unit 606 may also conduct manuscript inversion control.

The image forming device 600 is also provided with an image data storage unit 607, a printer control unit 608, a printer engine 609, a job log management unit 610, a power status notification unit 611, and a power control unit 612. The image data storage unit 607 temporarily stores image data that is produced by the print data development unit 605 and the scanner control unit 606. The printer control unit 608 controls the printer engine 609, and causes printing of the image data stored in the image data storage unit 607. The printer engine 609 actually conducts printing of image data stored in the image data storage unit 607 to a medium such as print paper using a known printing technology such as electrophotographic technology or inkjet technology.

The job log management unit 610 manages job log information. When a job is completed, the job management unit 604 transmits the job information to the job log management unit 610 as job log information, and the job log management unit 610 stores the received job log information. The job log management unit 610 transmits job logs in response to requests from the management server 102.

The power control unit 612 controls the power of the multifunction printer 104, and manages power statuses such as standby mode, power conservation mode, and power off. The power control unit 612 is capable of transitioning to various power statuses according to a variety of conditions. For example, in standby mode, when operations are not conducted for a fixed period of time with respect to the multifunction printer 104, or when receipt of print jobs, receipt of faxes, receipt of commands from the network, and the like are not conducted, the power control unit 612 transitions to power off or power conservation mode. The power control unit 612 changes the power status according to power status change requests from the management server 102, such as those for transition to power off or power conservation mode. Furthermore, the power control unit 612 transitions to power off or power conservation mode at preset times. The power control unit 612 notifies the power status notification unit 611 when the power status is changed.

The power status notification unit 611 receives notifications from the power control unit 612, and notifies the management server 102 of the power status via the interface unit 601. The power status notification unit 611 may also periodically notify the management server 102 of the power status. Specifically, power status notifications include the categories of standby in progress, power conservation transition, power conservation cancellation, power on, and power off. A notification of standby in progress indicates that the multifunction printer is proceeding with operations in standby mode. A notification of power conservation transition is provided when the multifunction printer transitions from standby mode to power conservation mode. A notification of power conservation cancellation is provided when the multifunction printer transitions from power conservation mode to standby mode. A notification of power on is provided when power is turned on from a power off status, and the multifunction printer transitions to standby mode. A notification of power off is provided when the multifunction printer transitions to power off. Note that, as to the method for conducting notification via the interface unit 601, it is acceptable to use a proprietary communication protocol, or a publicly defined communication protocol. Even with a management server 102 that has been designated in advance, notifications may be provided to multiple counterparts by multicasting or broadcasting.

Otherwise, it is also acceptable to have a multifunction printer with a configuration in which a power status notification function is not installed (in which the power status notification unit 611 is excluded). In this case, the power control unit 612 does not notify the power status notification unit 611 when the power status changes. The configuration of the printer 103 that does not have a scanner may be conceived as a configuration in which the UI control unit 603, the scanner control unit 606, and the like are removed from the configuration of the multifunction printer 104 described in FIG. 6.

<Device Information Table>

FIG. 7 shows an exemplary device information table with which the device information management unit 502 shown in FIG. 5 is provided. In FIG. 7, the example of reference numeral 701 is a device ID, and indicates an ID that uniquely identifies an image forming device within a system. The example shown by reference numeral 702 is a device name of the image forming device of the pertinent row. The example shown by reference numeral 703 is an IP address of the image forming device of the pertinent row, and is information that shows addressing on a network of image forming devices. The example shown by reference numeral 704 is a model of the image forming device of the pertinent row. The example shown by reference numeral 705 indicates whether or not the image forming device of the pertinent row has a power status notification function. In the case where the image forming device of the pertinent row has a configuration that is provided with the power status notification unit 611, the image forming device of the pertinent row has a power status notification function.

The example shown by reference numeral 706 is a maximum job log retention quantity of the image forming device of the pertinent row, and stores the maximum number of job logs that can be retained in the job log management unit 610 by the image forming device of the pertinent row. The example shown by reference numeral 707 is information relating to the hard disk of the image forming device of the pertinent row, and stores the information of whether or not a hard disk is installed. In the case where the image forming device of the pertinent row has a configuration provided with the disk controller (DKC) 308 and the hard disk (HD) 313, a hard disk is installed. Generally, it can be judged that an image forming device equipped with a hard disk is capable of storing a large number of job logs. The example shown by reference numeral 708 indicates information relating to data collection subjects, and stores the information of whether or not the image forming device of the pertinent row has data collection subjects. The details of data collection processing are described below. Information pertaining to data collection subjects is set in advance by managers and the like of the image forming device.

The example shown by reference numeral 709 stores a data acquisition status of the image forming device of the pertinent row. The data acquisition status is set in data collection processing. In the present embodiment, as data acquisition statuses, there is response confirmation standby, response confirmation in progress, data acquisition standby, data acquisition in progress, data acquisition complete, and compulsory data acquisition standby. The details of data collection processing are described below. The power status notification function 705, the maximum job log retention quantity 706, the hard disk information 707, and so on of the device information table can also be set so that initial values are determined by the model of the image forming apparatus. By means of the device information management unit 502, information can also be acquired from the image forming apparatus via the network by using a protocol such as, for example, SNMP.

<Power Status Information Table>

FIG. 8 shows an exemplary power status information table with which the power status monitoring unit 503 shown in FIG. 5 is provided. The power status information table is a table which records current power statuses by image forming device based on power status notifications transmitted by the image forming devices. In FIG. 8, the example shown by reference numeral 801 stores a device ID of the image forming device. The example shown by reference numeral 802 stores a date and time at which a power status transition of the image forming device of the pertinent row occurred. The example of reference numeral 803 stores a power status that was transitioned to at the date and time of the pertinent row by the image forming device of the pertinent row. The current power status of the image forming device is known by this information that is managed by the power status monitoring unit 503.

<Job Log Information Table>

FIG. 9 shows an exemplary job log information table with which the data collection unit 504 shown in FIG. 5 is provided. The data collection unit 504 stores job logs collected from multiple image forming devices in a job log information table. In FIG. 9, the example shown by reference numeral 901 stores a job log ID. The job log ID is an ID which uniquely identifies a job log within a system. The example shown by reference numeral 902 stores a device ID of the image forming device that processed the job. The example shown by reference numeral 903 stores job types. As job types, one may cite printing that is printing from a host, copying, scanning, fax transmission, fax reception, box printing that prints documents stored in a multifunction printer, and so on.

The example shown by reference numeral 904 stores a date and time of job processing initiation, and the example shown by reference numeral 905 stores a date and time of job processing termination. The example shown by reference numeral 906 stores the names of users who have instructed the jobs. By means of the information stored in the information table, it is possible to conduct management with respect to which jobs were issued by which image forming devices, when, and by whom. Moreover, the job log table may also be configured to be prepared by job type.

<Summary of Data Collection Processing>

A summary of data collection processing is described below using FIG. 10. Data collection processing is processing in which data is collected from an image forming device by the management server 102 as the management device. The management server 102 performs data collection processing at fixed intervals, and collects the data from multiple image forming devices. In the present embodiment, an example is shown in which job log information is collected from image forming devices.

In data collection processing, the management server 102 confirms whether the image forming device is in a respondable condition (e.g., whether the condition is such that power is not off, and data acquisition is possible) by the response confirmation processing described below using FIG. 15. The management server 102 then performs the data acquisition processing described below using FIG. 19 with respect to an image forming device for which the response confirmation result was OK. By this means, the management server 102 is able to perform data acquisition processing only with respect to image formation devices that are in a status enabling data acquisition. In short, the management server 102 is able to perform data acquisition from multiple image forming devices in a short time, and there is very little possibility that an image forming device would not respond during data acquisition, and that standby would occur until elapse of a timeout period.

Furthermore, by means of the initiation/stoppage of the response confirmation control processing described below in FIG. 13, the management server 102 temporarily stops the response confirmation processing shown in FIG. 15 in the case where the number of the image forming devices shown in FIG. 19 that are subjects of data acquisition—i.e., that are in data acquisition processing standby—attains or exceeds a prescribed number. In the case where the image forming devices that are in data acquisition processing standby increase in number, the time from the response of response confirmation until the management server 102 executes data acquisition processing lengthens. As a result, an image forming device for which a response confirmation result was OK enters an unrespondable status in the interval until data acquisition processing is executed, increasing the possibility that at the time of data acquisition it will have been in standby until the timeout interval has elapsed. By conducting the control of initiation/stoppage of response confirmation control processing, it is possible to prevent lengthening of the time from the response of response confirmation until the execution of data acquisition processing.

Figure 10:
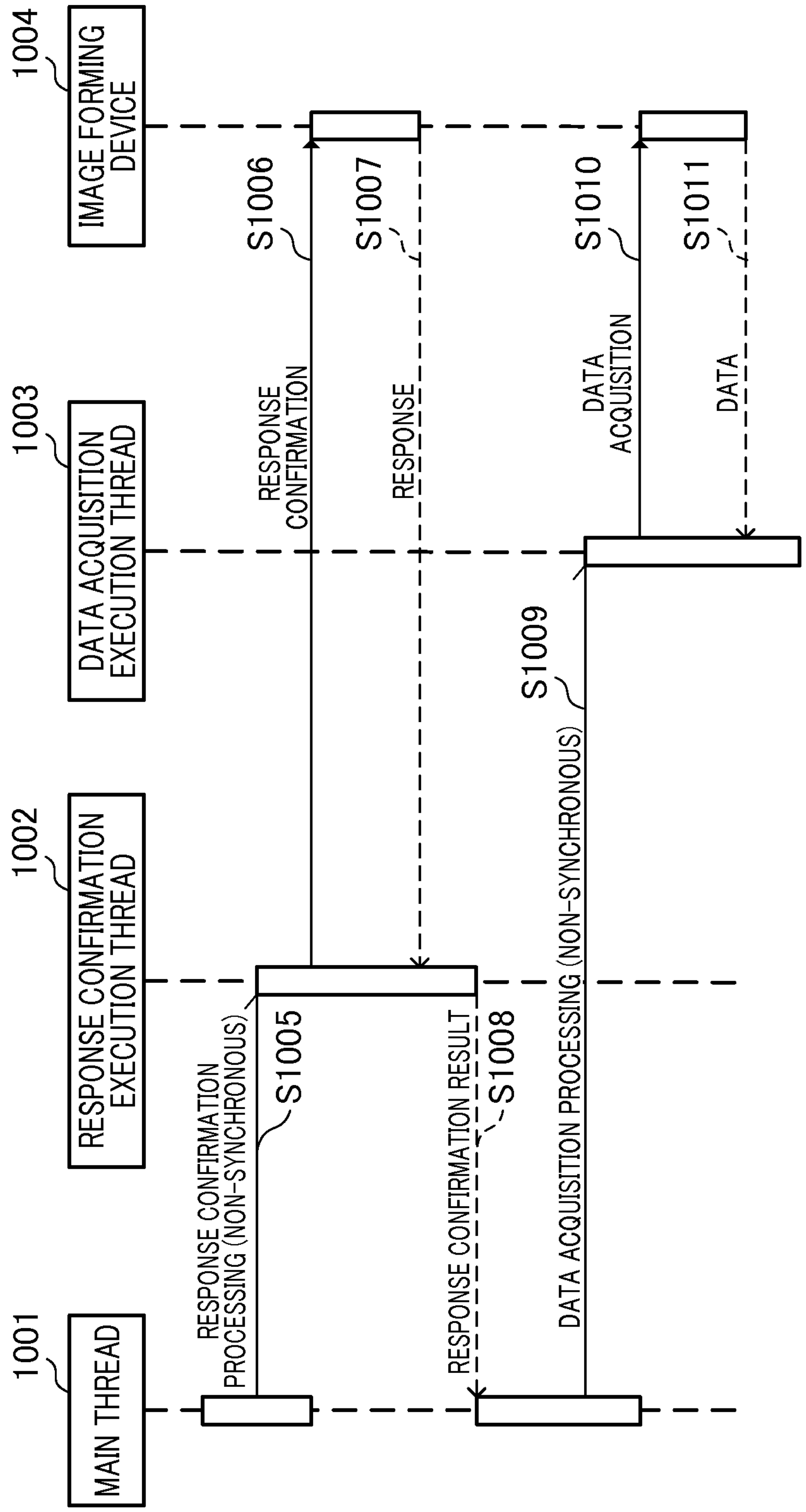
FIG. 10 is a sequence drawing which shows an exemplary data collection processing flow.

FIG. 10 is a sequence drawing which shows an example of a data collection processing flow conducted with respect to an image forming device by the data collection unit 504 of the management server 102. In FIG. 10, a main thread 1001 is an object which shows a thread, and is a thread in which data collection processing is executed by the data collection unit 504. The main thread executes processing other than the processing that is executed by the below-described response confirmation execution thread 1002 and the data acquisition execution thread 1003. The response confirmation execution thread 1002 is an object which shows a thread, and is a thread in which the data collection unit 504 non-synchronously executes the response confirmation processing shown in FIG. 15. The data acquisition execution thread 1003 is an object which shows a thread, and as a thread in which the data collection unit 504 non-synchronously executes the data acquisition processing shown in FIG. 19. The image forming device 1004 is an object which shows an image forming device.

When data collection processing is started, in S1005, the main thread 1001 issues an instruction for execution of response confirmation processing to the response confirmation execution thread 1002. In S1006, the response confirmation execution thread 1002 executes response confirmation with respect to the image forming device 1004. Subsequently, in S1007, the image forming device 1004 transmits a response to a response confirmation 1006. In this instance, in the case where the power status of the image forming device 1004 is power off, the image forming device 1004 cannot transmit a response to the response confirmation 1006. In S1008, the response confirmation execution thread 1002 notifies the main thread 1001 of the response confirmation result. In this instance, the response confirmation execution thread 1002 provides a notification of "OK" as the response confirmation result in the case where there was a response from the image forming device 1004, and a notification of NG as the response confirmation result in the case where there was no response.

Subsequently, in S1009, the main thread 1001 issues an instruction for execution of data acquisition processing to the data acquisition execution thread 1003. In this instance, in the case where there was a response confirmation result of NG, the main thread 1001 terminates this processing without issuing an instruction for execution of data acquisition processing. In S1010, the data acquisition execution thread 1003 executes data acquisition with respect to the image forming device 1004. Subsequently, in S1011, the image forming device 1004 transmits data to the request for data acquisition 1010. The data acquisition execution thread 1003 stores the received data, and terminates this processing.

<Data Collection Processing>

Figure 11:
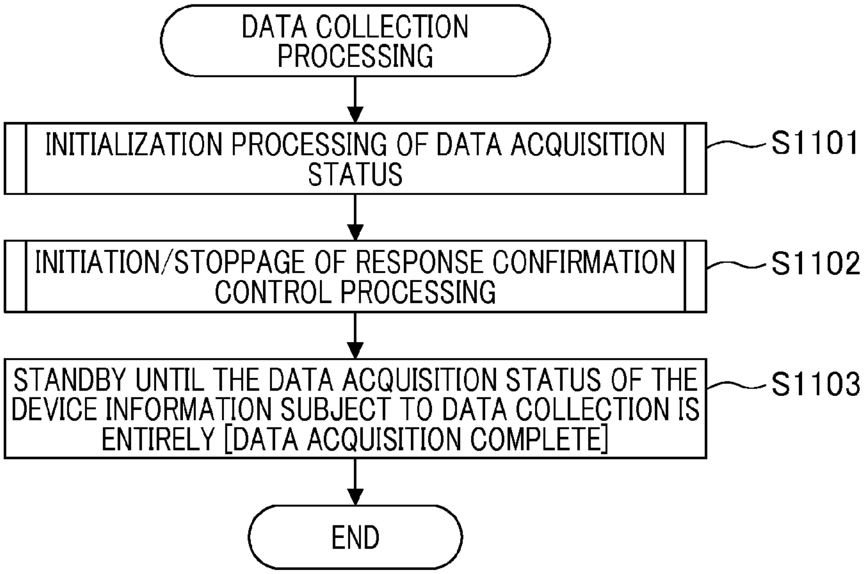
FIG. 11 is a flowchart which shows an exemplary processing sequence of data collection processing.

FIG. 11 is a flowchart which shows an example of a first data processing procedure conducted by the data collection unit 504 of the management server 102 of the present embodiment. The management server 102 executes the data collection processing shown in FIG. 11 at fixed intervals, and collects data from multiple image forming devices. S1101 to S1103 show the respective steps, and the respective steps are implemented by having the CPU 201 load a control program from the HD 211, the ROM 202 or the like to the RAM 203, and run it.

When data collection processing is initiated, the data collection unit 504 conducts the initialization processing of data acquisition status in S1101. The details of initialization processing of data acquisition status are described below using FIG. 12. Subsequently, in S1102, the data collection unit 504 conducts initiation/stoppage of response confirmation control processing. The details of initiation/stoppage of response confirmation control processing are described below using FIG. 13. Subsequently, in S1103, the data collection unit 504 waits until the data acquisition statuses of the device information of the data collection subjects are all [Data Acquisition Complete], and terminates this processing.

<Initialization Processing of Data Acquisition Status>

Figure 12:
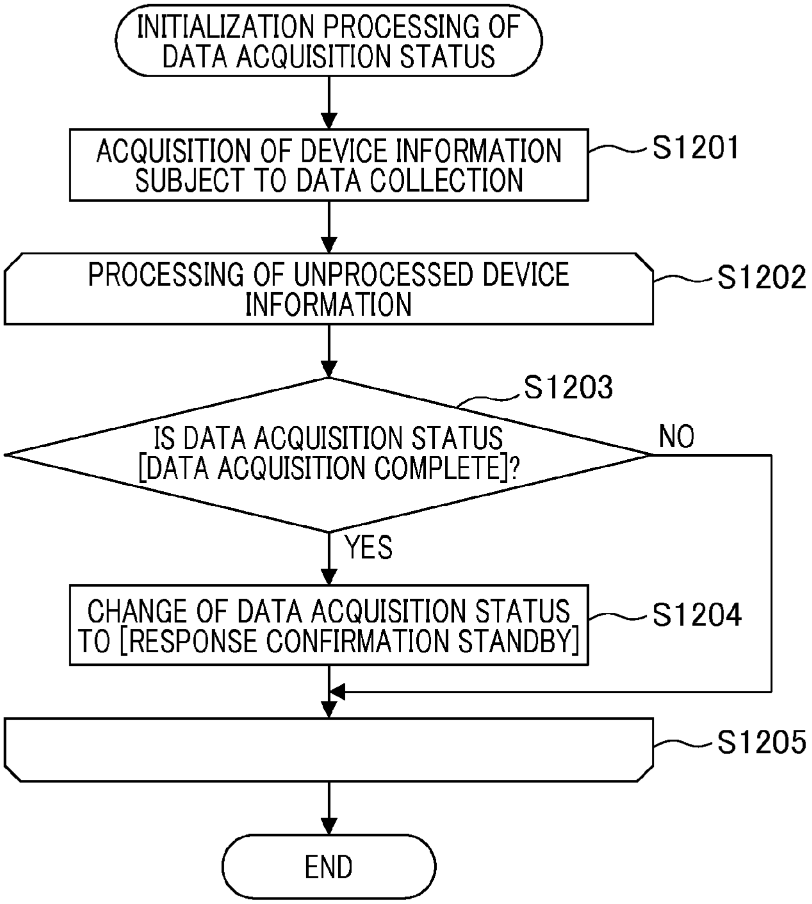
FIG. 12 is a flowchart which shows an example of initialization processing for data acquisition status.

FIG. 12 is a flowchart which shows an example of a second data processing procedure conducted by the data collection unit 504 of the management server 102 of the present embodiment. The present example is an example of a detailed sequence of initialization processing of the data acquisition status executed in S1101 shown in FIG. 11. In the initialization processing of the data acquisition status, a data acquisition status 709 of data information stored in the device information management unit 502 is initialized. S1201 to S1205 show the respective steps, and the respective steps are implemented by having the CPU 201 load a control program from the HD 211, the ROM 202 or the like to the RAM 203, and run it.

When the initialization processing of the data acquisition status is started, in S1201, the data collection unit 504 acquires the device information that is the subject of data collection from the device information shown in FIG. 7 that is stored in the device information management unit 502. With respect to unprocessed device information, the data collection unit 504 repeats the processing from S1202 to S1205. Subsequently, in S1203, the data collection unit 504 determines whether or not the data acquisition status 709 of the device information being processed is [Data Acquisition Complete.] In this instance, in the case where the data collection unit 504 determines that the data acquisition status 709 is [Data Acquisition Complete], the processing advances to S1204. On the other hand, in the case where the data collection unit 504 determines that the data acquisition status 709 is not [Data Acquisition Complete], the processing advances to S1205. Subsequently, in S1204, the data collection unit 504 changes the data acquisition status 709 of the device information being processed to [Response Confirmation Standby], and saves it.

Subsequently, in S1205, the data collection unit 504 determines whether there is device information for which the processing of S1202 to S1205 has not been conducted. In this instance, in the case where it is determined that there is device information for which the processing of S1202 to S1205 has not been conducted, the data collection unit 504 returns to S1202, and repeats the processing. On the other hand, in the case where it is determined that there is no device information for which the processing of S1202 to S1205 has not been conducted, the data collection unit 504 terminates this processing.

<Initiation/Stoppage of Response Confirmation Control Processing>

Figure 13:
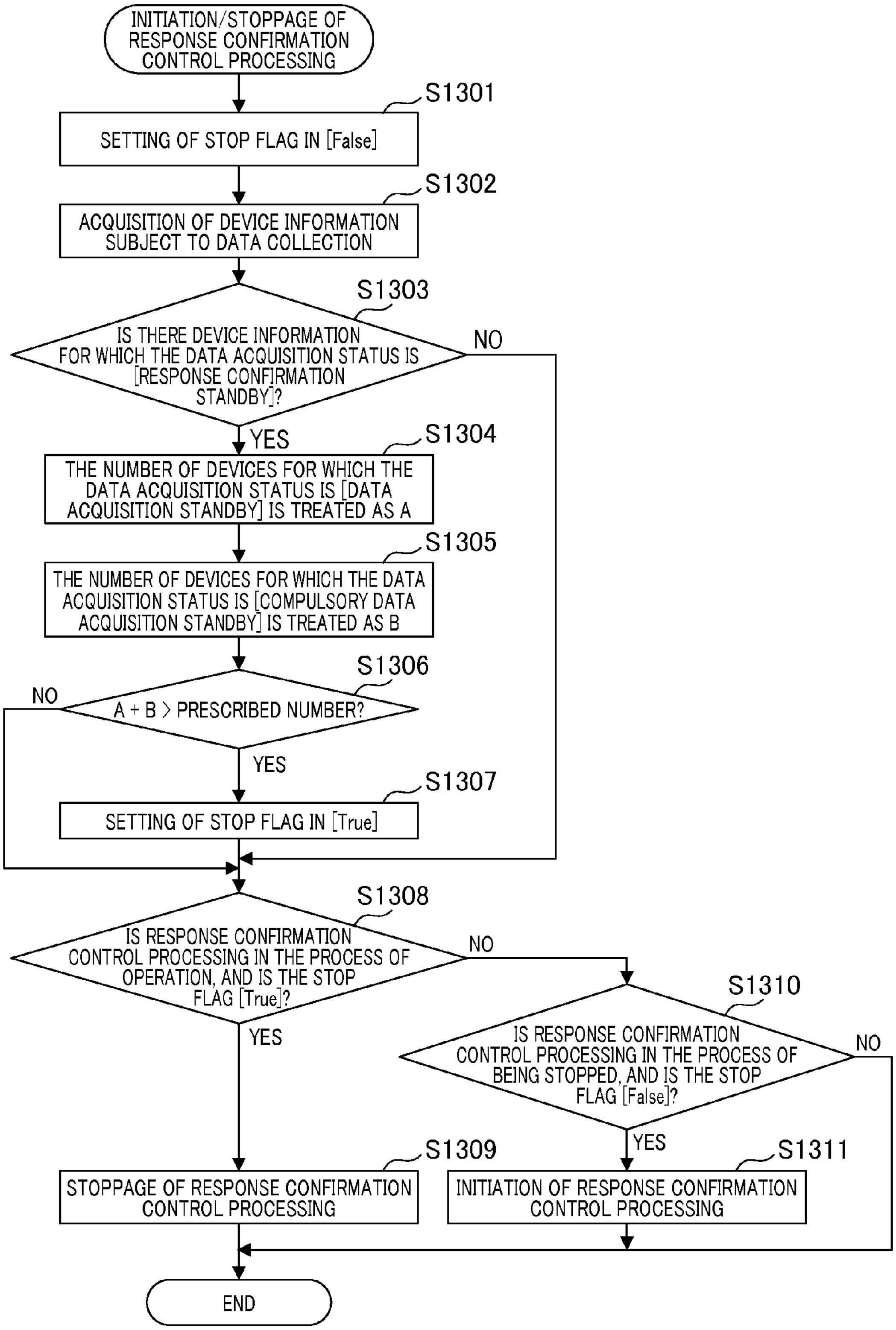
FIG. 13 is a flowchart which shows an exemplary processing sequence for initiation/stoppage of response confirmation.

FIG. 13 is a flowchart which shows an example of a third data processing procedure conducted by the data collection unit 504 of the management server 102 of the present embodiment. The present example is an example of a detailed sequence of initiation/stoppage of response confirmation control processing executed in S1102 and the like shown in FIG. 11. The initiation/stoppage of response confirmation control processing includes processing for temporary stoppage of the response confirmation processing shown in FIG. 15, in the case where the number of image forming devices for which the data acquisition processing shown in FIG. 19 is executed attains or exceeds a prescribed number. By this means, it is possible to prevent lengthening of the time from the response of response confirmation until the execution of data acquisition processing. S1301 to S1311 show the respective steps, and the respective steps are implemented by having the CPU 201 load a control program from the HD 211, the ROM 202 or the like to the RAM 203, and run it.

When the initiation/stoppage of response confirmation control processing is started, the data collection unit 504 sets a stoppage flag in [False] in S1301. Subsequently, in S1302, the data collection unit 504 acquires the device information that is the subject of data collection from the device information shown in FIG. 7 that is stored in the device information management unit 502. Subsequently, in S1303, the data collection unit 504 determines whether or not there is device information for which the data acquisition status 709 is [Response Confirmation Standby] in the device information acquired in S1302. In this instance, in the case where the data collection unit 504 determines that there is device information for which the data acquisition status 709 is [Response Confirmation Standby], the processing advances to S1304. On the other hand, in the case where the data collection unit 504 determines that there is no device information for which the data acquisition status 709 is [Response Confirmation Standby], the processing advances to S1307.

Subsequently, in S1304, the data collection unit 504 calculates the number of pieces of device information for which the data acquisition status 709 is [Data Acquisition Standby] in the device information acquired in S1302, and treats it as A. Subsequently, in S1305, the data collection unit 504 calculates the number of pieces of device information for which the data acquisition status 709 is [Compulsory data acquisition Standby] in the device information acquired in S1303, and treats it as B. Subsequently, in S1306, the data collection unit 504 determines whether or not the value obtained by adding A calculated in S1304 and B calculated in S1305 is larger than the prescribed number. In this instance, in the case where the data collection unit 504 determines that the value obtained by adding A and B is larger than the prescribed number, the processing advances to S1307. On the other hand, in the case where the data collection unit 504 determines that the value obtained by adding A and B is the prescribed number or less, the processing advances to S1308.

Subsequently, in S1307, the data collection unit 504 sets a stop flag in [True]. Subsequently, in S1308, the data collection unit 504 determines whether or not response confirmation control processing is underway, and the stop flag is [True]. In this instance, in the case where the data collection unit 504 determines that response confirmation control processing is underway, and that the stop flag is [True], the processing advances to S1309. On the other hand, in the case where the data collection unit 504 determines that response confirmation control processing is stopped, or that the stop flag is [False], the processing advances to S1310. Subsequently, in S1309, the data collection unit 504 stops response confirmation control processing, and terminates this processing.

On the other hand, in S1310, the data collection unit 504 determines whether or not response confirmation control processing is stopped, and the stop flag is [False]. In this instance, in the case where the data collection unit 504 determines that response confirmation control processing is stopped, and that the stop flag is [False], the processing advances to S1311. On the other hand, in the case where the data collection unit 504 determines that response confirmation control processing is underway, or that the stop flag is [True], this processing terminates. Subsequently, in S1311, the data collection unit 504 starts response confirmation control processing, and terminates this processing.

<Response Confirmation Control Processing>

Figure 14:
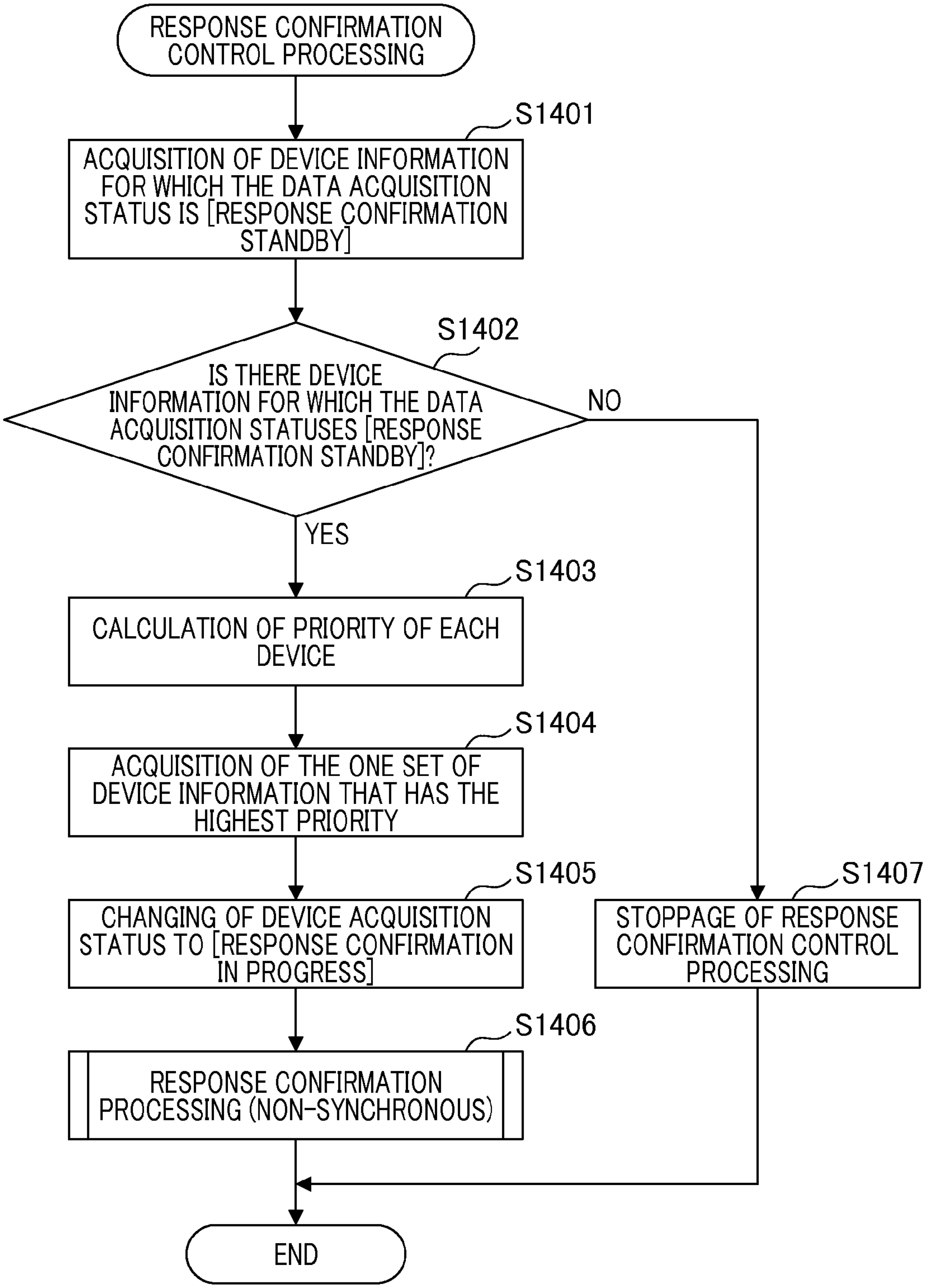
FIG. 14 is a flowchart which shows an example of control processing of response confirmation.

FIG. 14 is a flowchart which shows an example of a fourth data processing procedure conducted by the data collection unit 504 of the management server 102 of the present embodiment. The management server 102 monitors the data acquisition status 709 of the device information, and in the case where there is device information in response confirmation standby, this response confirmation control processing is executed at fixed intervals in order to give instructions for execution of the response confirmation processing shown in FIG. 15. However, in the case where this response confirmation control processing is stopped, execution at fixed intervals is stopped. The response confirmation control processing includes processing which calculates the priority of the data acquisition order of the image forming device, and which instructs execution of the response confirmation processing shown in FIG. 15 beginning from the image forming device with the highest priority.

In the case where the data of an image forming device reaches the maximum data retention volume, old data is deleted. When data is deleted prior to data collection by the management server, data loss occurs. Consequently, with respect to image forming devices for which maximum data retention volume is low, the priority is set high, and data acquisition is preferentially conducted. For example, the priority is set high with respect to an image forming device for which the maximum job log retention quantity 706 of the device information stored in the device information management unit 502 is smaller than the prescribed value. Moreover, based on the information of the model 704, the priority of models that have a low maximum data retention capacity is set high. In addition, based on the hard disk information 707, the priority of image forming devices in which a hard disk is not installed is set high. By this means, it is possible to minimize the possibility that data loss may occur. Otherwise, S1401 to S1407 show the respective steps, and the respective steps are implemented by having the CPU 201 load a control program from the HD 211, the ROM 202 or the like to the RAM 203, and run it.

When response confirmation control processing is started, in S1401, the data collection unit 504 acquires device information for which the data acquisition status 709 is [Response Confirmation Standby] from the device information stored in the device information management unit 502. Subsequently, in S1402, the data collection unit 504 determines whether or not there is device information that was acquired in S1401. In this instance, in the case where the data collection unit 504 determines that there is device information that was acquired in S1401, the processing advances to S1403. On the other hand, in the case where the data collection unit 504 determines that there is no device information that was acquired in S1401, the processing advances to S1407. Subsequently, in S1403, the data collection unit 504 calculates the priority of the respective image forming device based on the device information acquired in S1401, and determines an order of priority.

Subsequently, in S1404, the data collection unit 504 acquires the one set of device information with the highest priority from among the device information acquired in S1401. Subsequently, in S1405, the data collection unit 504 changes the data acquisition status 709 of the device information acquired in S1404 to [Response Confirmation Underway], and saves it. Subsequently, in S1406, the data collection unit 504 establishes the device information acquired in S1404 as a parameter, non-synchronously executes response confirmation processing, and terminates this processing. The details of response confirmation processing are described below. On the other hand, in S1407, the data collection unit 504 stops response confirmation control processing, and terminates this processing.

<Response Confirmation Processing>

Figure 15:
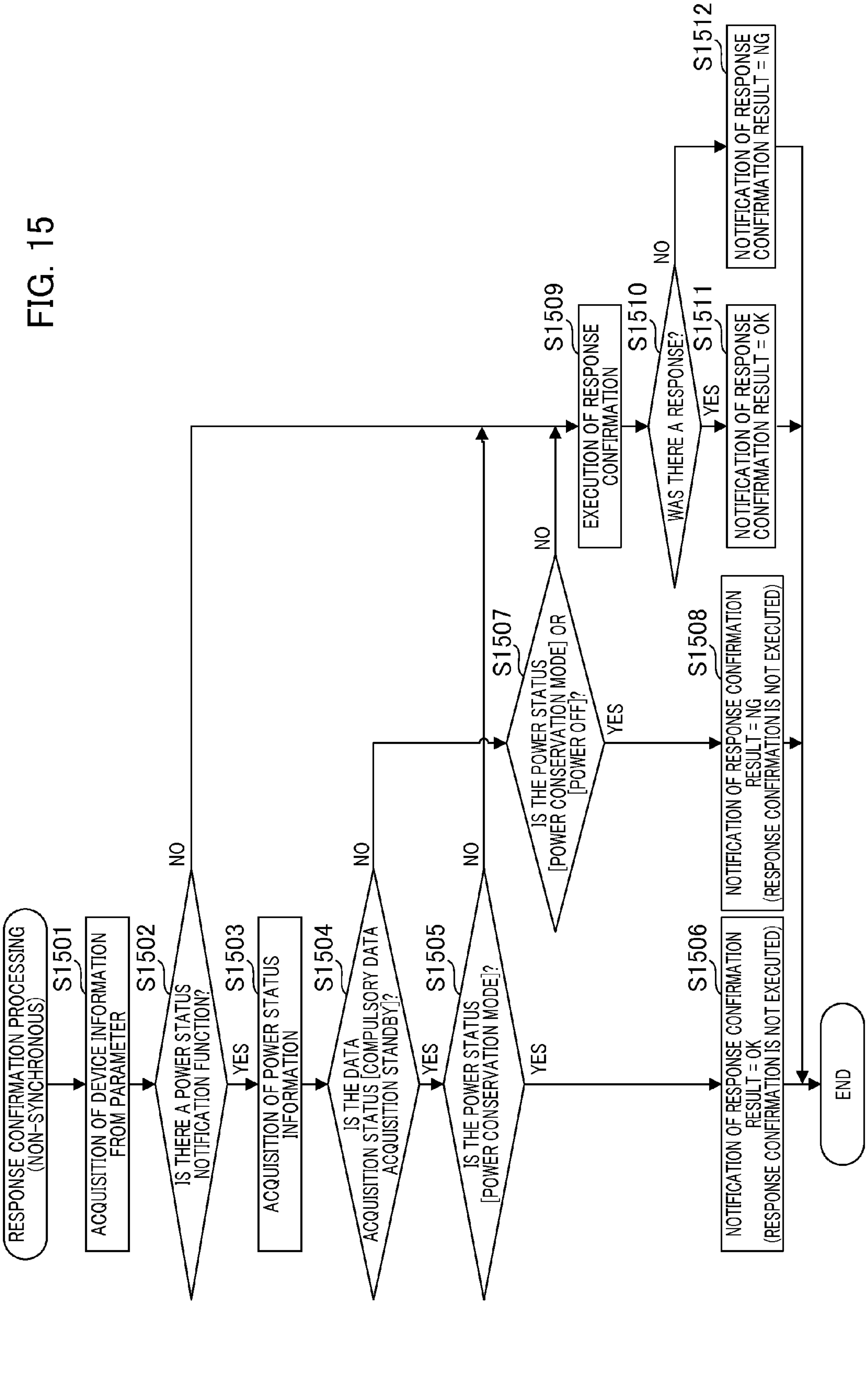
FIG. 15 is a flowchart which shows an example of response confirmation processing.

FIG. 15 is a flowchart which shows an example of a fifth data processing procedure conducted by the data collection unit 504 of the management server 102 of the present embodiment. This example is an example of a detailed sequence of response confirmation processing that is non-synchronously executed in S1406 shown in FIG. 14. This response confirmation processing includes processing which determines that response confirmation is to be executed with respect to an image forming device that does not have a power status notification function, and which determines whether or not response confirmation is to be executed based on the data acquisition status 709 and the power status 803 with respect to an image forming device that has a power status notification function. By this means, response confirmation is executed with respect to image forming devices in the power conservation mode, enabling prevention of cancellation of power conservation mode. Furthermore, multiple image forming devices can be processed in a short time without executing wasteful response confirmation with respect to an image forming device for which a response confirmation result can be judged in advance. Otherwise, S1501 to S1512 show the respective steps, and the respective steps are implemented by having the CPU 201 load a control program from the HD 211, the ROM 202 or the like to the RAM 203, and run it.

When response confirmation processing is started, in S1501, the data collection unit 504 acquires device information from the parameter set in S1406. Subsequently in S1502, the data collection unit 504 determines whether or not there is a power status notification function in the image forming device from the device information acquired in S1501. In this instance, in the case where the data collection unit 504 determines that there is a power status notification function in the image forming device, the processing advances to S1503. On the other hand, in the case where the data collection unit 504 determines that there is not a power status notification function in the image forming device, the processing advances to S1509.

In S1503, the data collection unit 504 acquires the power status information pertaining to the image forming device of the device information that was acquired in S1501 from the power status information stored in the power status monitoring unit 503. In S1504, the data collection unit 504 determines whether or not the data acquisition status 709 of the device information acquired in S1501 is [Compulsory Data Acquisition Standby]. In this instance, in the case where the data collection unit 504 determines that the data acquisition status 709 is [Compulsory Data Acquisition Standby], the processing advances to S1505. On the other hand, in the case where the data collection unit 504 determines that the data acquisition status 709 is not [Compulsory Data Acquisition Standby], the processing advances to S1507.

In S1505, the data collection unit 504 determines whether or not the power status 803 of the power status information acquired in S1503 is [Power Conservation Mode]. In this instance, in the case where the data collection unit 504 determines that the power status 803 is [Power Conservation Mode], the processing advances to S1506. On the other hand, in the case where the data collection unit 504 determines that the power status 803 is not [Power Conservation Mode], the processing advances to S1509. Subsequently, in S1506, the data collection unit 504 establishes as a parameter that the response confirmation result is OK with the device information acquired in S1501, provides notification of the response confirmation result, and terminates this processing.

In the case where the data acquisition status is not [Compulsory data acquisition Standby] in S1504, the data collection unit 504 determines in S1507 whether or not the power status 803 of the power status information acquired in S1503 is [Power Conservation Mode] or [Power Off]. In this instance, in the case where the data collection unit 504 determines that the power status 803 is [Power Conservation Mode] or [Power Off], the processing advances to S1508. On the other hand, in the case where the data collection unit 504 determines that the power status 803 is not [Power Conservation Mode] or [Power Off], the processing advances to S1509. Subsequently, in S1508, the data collection unit 504 establishes as a parameter that the response confirmation result is NG with the device information acquired in S1501, provides notification of the response confirmation result, and terminates this processing.

In the case where it is determined that there is no power status notification function in S1502, the data collection unit 504 executes response confirmation in S1509 with respect to the image forming device of the device information acquired in S1501. In S1510, the data collection unit 504 determines whether or not there was a response from the image forming device to the response confirmation request executed in S1509. In this instance, in the case where the data collection unit 504 determines that there was a response from the image forming device, the processing advances to S1510. On the other hand, in the case where the data collection unit 504 determines that there was no response from the image forming device, the processing advances to S1512.

Subsequently, in S1511, the data collection unit 504 establishes as a parameter that the response confirmation result is OK with the device information acquired in S1501, provides notification of the response confirmation result, and terminates this processing. Subsequently in S1512, the data collection unit 504 establishes as a parameter that the response confirmation result is NG with the device information acquired in S1501, provides notification of the response confirmation result, and terminates this processing. In short, the notification processing in S1506, 1508, 1511 and 1512 corresponds to the processing of S1008 that was described using FIG. 10, in which the response confirmation result is notified to the main thread 1001 by the response confirmation execution thread 1002. The details of response confirmation result reception processing which receives this response confirmation result are described below.

<Response Confirmation Result Reception Processing>

Figure 16:
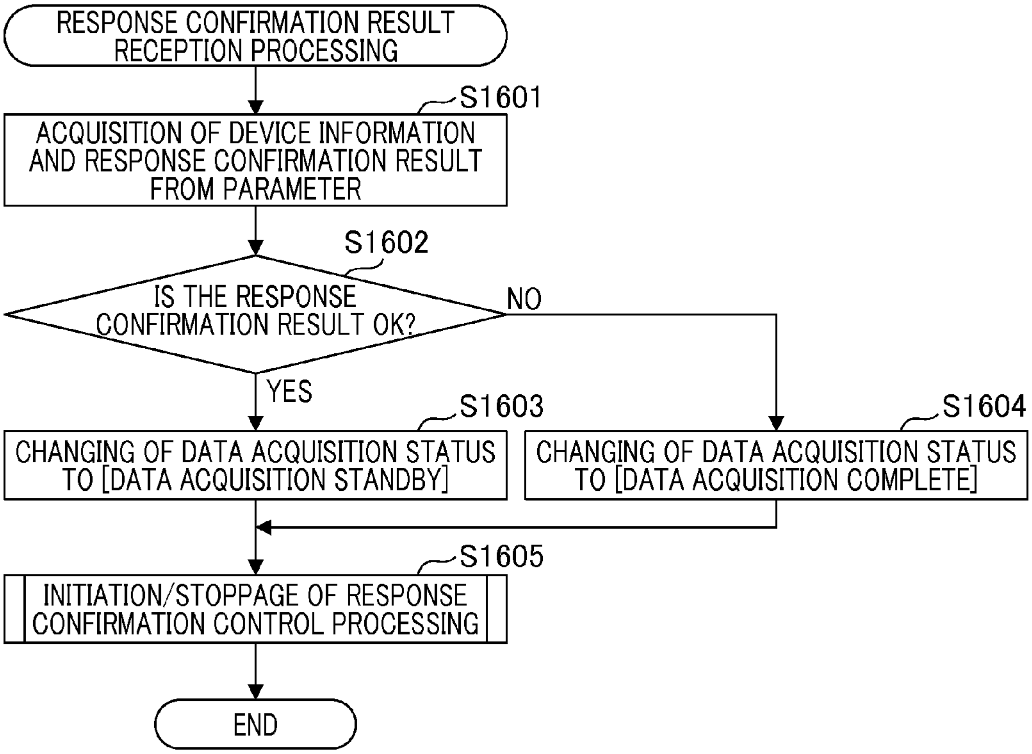
FIG. 16 is a flowchart which shows an example of response confirmation result receipt processing.

FIG. 16 is a flowchart which shows an example of a sixth data processing procedure conducted by the data collection unit 504 of the management server 102 of the present embodiment. The present example is an example of the detailed sequence of response confirmation result reception processing executed when notification is provided of a response confirmation result in S1506, S1508, S1511, and S1512 shown in FIG. 15. In response confirmation result reception processing, a response confirmation result is received, and the data acquisition status 709 is set to data acquisition standby in sequence from an image forming device for which a respondable status has been able to be confirmed. Otherwise, S1601 to S1605 show the respective steps, and the respective steps are implemented by having the CPU 201 load a control program from the HD 211, the ROM 202 or the like to the RAM 203, and run it.

When response confirmation result reception processing is started, in S1601, the data collection unit 504 acquires a response confirmation result from the parameter established at the time of the response confirmation result notification of response confirmation processing. In S1602, the data collection unit 504 determines whether or not the response confirmation result acquired in S1601 is OK. In this instance, in the case where the data collection unit 504 determines that the response confirmation result is OK, the processing advances to S1603. On the other hand, in the case where the data collection unit 504 determines that the response confirmation result is not OK, the processing advances to S1604. In short, with S1506 and S1511, the processing advances to S1603, because the response confirmation result is OK; with S1508 and S1512, the processing advances to S1604, because the response confirmation result is NG.

Subsequently, in S1603, the data collection unit 504 changes the data acquisition status 709 of the device information acquired in S1601 to [Data Acquisition Standby], and saves it. On the other hand, in S1604, the data collection unit 504 changes the data acquisition status 709 of the device information acquired in S1601 to [Data Acquisition Complete], and saves it. Subsequently, in S1605, the data collection unit 504 conducts initiation/stoppage of response confirmation control processing, and terminates this processing.

<Compulsory Data Acquisition Request Reception Processing>

Figure 17:
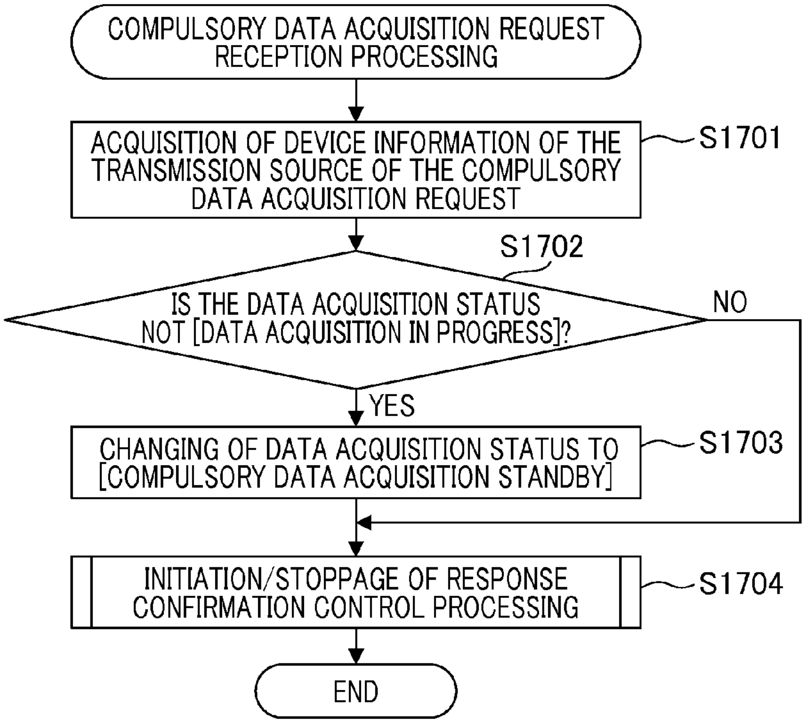
FIG. 17 is a flowchart which shows an example of receipt processing for a compulsory data acquisition request.

FIG. 17 is a flowchart which shows an example of a seventh data processing procedure conducted by the data collection unit 504 of the management server 102 of the present embodiment. Compulsory data acquisition request reception processing is executed when a compulsory data acquisition request that is transmitted from an image forming device is received by the management server 102. In the case where a request does not arrive from the management server 102, i.e., the volume of uncollected data reaches or exceeds the prescribed volume, the job log management unit 610 of the image forming device transmits a compulsory data acquisition request to the management server 102. In compulsory data acquisition request reception processing, the data collection unit 504 sets the data acquisition status 709 of the image forming device that was the transmission source of the compulsory data acquisition request to compulsory data acquisition standby. Otherwise, S1701 to S1704 show the respective steps, and the respective steps are implemented by having the CPU 201 load a control program from the HD 211, the ROM 202 or the like to the RAM 203, and run it.

When compulsory data acquisition request reception processing is started, in S1701, the data collection unit 504 acquires the device information pertaining to the image forming device that was the transmission source of the compulsory data acquisition request from the device information stored in the device information management unit 502. In S1702, the data collection unit 504 determines whether or not the data acquisition status 709 of the device information acquired in S1701 is [Data Acquisition in Progress]. In this instance, in the case where the data collection unit 504 determines that the data acquisition status 09 is [Data Acquisition in Progress], the processing advances to S1703. On the other hand, in the case where the data collection unit 504 determines that the data acquisition status is not [Data Acquisition in Progress], the processing advances to S1704. Subsequently, in S1703, the data collection unit 504 changes the data acquisition status 709 of the device information acquired in S1701 to [Compulsory Data Acquisition Standby], and saves it. Subsequently, in S1704, the data collection unit 504 conducts initiation/stoppage of response confirmation control processing, and terminates this processing.

<Data Acquisition Control Processing>

Figure 18:
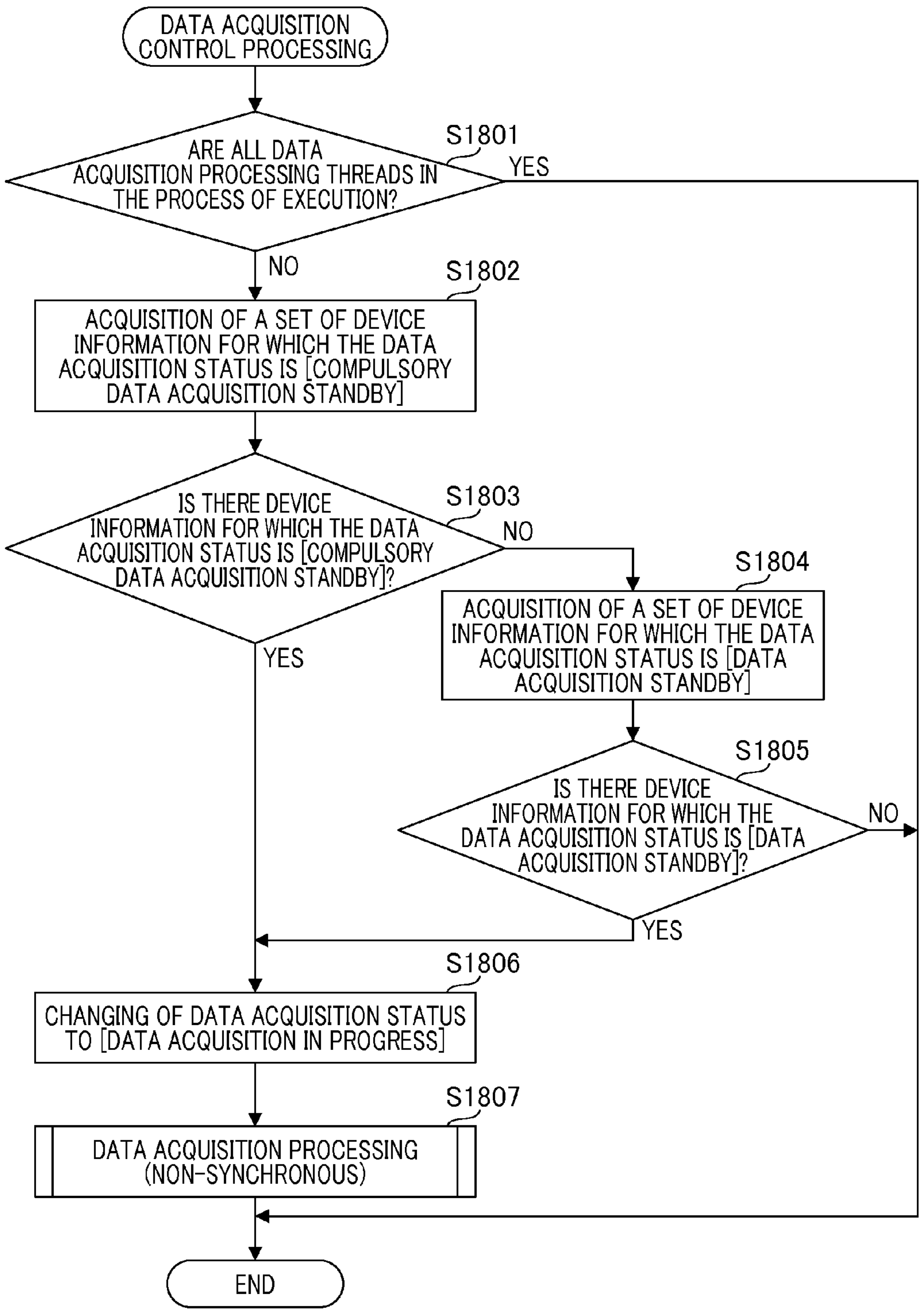
FIG. 18 is a flowchart which shows an example of data acquisition control processing.

FIG. 18 is a flowchart which shows an example of an eighth data processing procedure conducted by the data collection unit 504 of the management server 102 of the present embodiment. As the management server 102 monitors the data acquisition status 709 of the device information, and as it issues an instruction to execute the data acquisition processing shown in FIG. 19 in the case where there is device information in data acquisition standby, the control processing of this data acquisition is executed at fixed intervals. Data acquisition control processing includes processing in which instructions for execution of data acquisition processing are preferentially issued to image forming devices whose data acquisition status 709 is compulsory data acquisition standby. By this means, it is possible to preferentially conduct data acquisition with respect to image forming devices for which the volume of uncollected data has reached or exceeded the prescribed volume, and reduce the possibility of occurrence of data loss. Otherwise, S1801 to S1807 show the respective steps, and the respective steps are implemented by having the CPU 201 load a control program from the HD 211, the ROM 202 or the like to the RAM 203, and run it.

Figure 19:
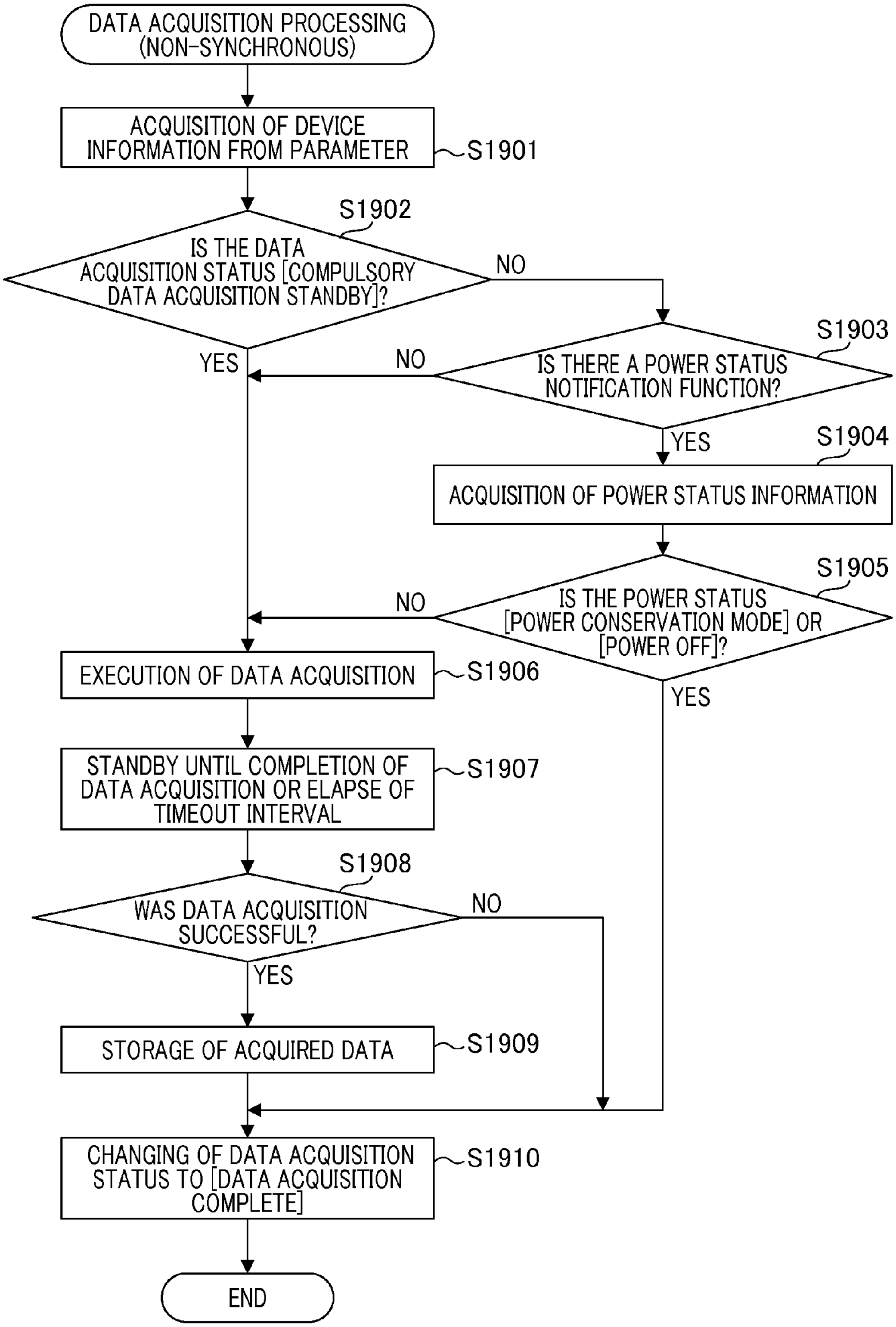
FIG. 19 is a flowchart which shows an example of data acquisition processing.

When data acquisition control processing is started, in S1801, the data collection unit 504 determines whether or not the threads which execute the data acquisition processing shown in FIG. 19 are all in the process of execution. The number of threads which execute data acquisition processing is preset according to the number of image forming devices or the like that are the subject of data collection. In this instance, in the case where the data collection unit 504 determines that all of the threads which execute data acquisition processing are in the process of execution, this processing terminates. On the other hand, in the case where the data collection unit 504 determines that all of the threads which execute data acquisition processing are not in the process of execution, the processing advances to S1802.

In S1802, the data collection unit 504 acquires one set of device information for which the data acquisition status 709 is [Compulsory Data Acquisition Standby] from the device information that is stored in the device information management unit 502. In S1803, the data collection unit 504 determines whether or not there was device information acquired in S1802. In this instance, the processing advances to S1804 in the case where the data collection unit 504 determines that there was device information acquired in S1802. On the other hand, the processing advances to S1806 in the case where the data collection unit 504 determines that there was no device information acquired in S1802.

In S1804, the data collection unit 504 acquires one set of device information for which the data acquisition status 709 is [Data Acquisition Standby] from the device information that is stored in the device information management unit 502. In S1805, the data collection unit 504 determines whether or not there was device information acquired in S1804. In this instance, the processing advances to S1806 in the case where the data collection unit 504 determines that there was device information acquired in S1804. On the other hand, this processing terminates in the case where the data collection unit 504 determines that there was no device information acquired in S1804.

In S1806, the data collection unit 504 changes the data acquisition status 709 of the device information acquired in S1802 or S1804 to [Data Acquisition in Progress], and saves it. Subsequently, in S1807, the data collection unit 504 establishes the device information acquired in S1802 or S1804 as a parameter, non-synchronously executes data acquisition processing, and terminates this processing. The details of data acquisition processing are described below.

<Data Acquisition Processing>

FIG. 19 is a flowchart which shows an example of a ninth data processing procedure conducted by the data collection unit 504 of the management server 102 of the present embodiment. This example is an example of the detailed sequence of data acquisition processing that is non-synchronously executed in S1806 shown in FIG. 18. Otherwise, S1901 to S1910 show the respective steps, and the respective steps are implemented by having the CPU 201 load a control program from the HD 211, the ROM 202 or the like to the RAM 203, and run it.

When data acquisition processing starts, in S1901, the data collection unit 504 acquires the device information from the parameter established in S1806. In S1902, the data collection unit 504 determines whether or not the data acquisition status 709 of the device information acquired in S1901 is [Compulsory Data Acquisition Standby]. In this instance, in the case where the data collection unit 504 determines that the data acquisition status 709 is [Compulsory Data Acquisition Standby], the processing advances to S1906. On the other hand, in the case where the data collection unit 504 determines that the data acquisition status 709 is not [Compulsory Data Acquisition Standby], the processing advances to S1903.

In S1903, the data collection unit 504 determines whether there is a power status notification function in the image forming device from the device information acquired in S1901. In this instance, in the case where the data collection unit 504 determines that there is a power status notification function in the image forming device, the processing advances to S1904. On the other hand, in the case where the data collection unit 504 determines that there is not a power status notification function in the image forming device, the processing advances to S1906. Subsequently, in S1904, the data collection unit 504 acquires the power status information pertaining to the image forming device of the device information acquired in S1901 from the power status information stored in the power status monitoring unit 503. In S1905, the data collection unit 504 determines whether or not the power status 803 of the power status information acquired in S1904 is [Power Conservation Mode] or [Power Off]. In this instance, in the case where the data collection unit 504 determines that the power status 803 is [Power Conservation Mode] or [Power Off], the processing advances to S1910. In S1910, the data collection unit 504 then updates the data acquisition status to [Data Acquisition Complete]. By this means, even in the case where data cannot be obtained from the image forming device, the management device 102 can appropriately manage the data. On the other hand, in the case where the data collection unit 504 determines that the powers status 803 is not [Power Conservation Mode] or [Power Off], the processing advances to S1906.

In the case where the data acquisition status is [Compulsory Data Acquisition Standby] in S1902, the data collection unit 504 executes data acquisition in S1906 with respect to the image forming device of the device information acquired in S1901 (S1906). In S1907, the data collection unit 504 waits until the data acquisition that is executed in S1906 is complete, or until the timeout interval has elapsed. There is processing in which standby is conducted until the timeout interval has elapsed, but the configuration is such that response confirmation is executed in advance, and data acquisition is executed only with respect to image forming devices that are in a condition enabling response. Consequently, there is very little possibility that there would be no response from an image forming device, and that standby would be conducted until the timeout interval elapses. Accordingly, the time arising in data acquisition is reduced, and processing efficiency is enhanced.

Subsequently, in S1908, the data collection unit 504 determines whether or not the data acquisition executed in S1906 was successful. In this instance, in the case where the data collection unit 504 determines that data acquisition was successful, the processing advances to S1909. On the other hand, in the case where the data collection unit 504 determines that the data acquisition was not successful, the processing advances to S1910. In S1909, the data collection unit 504 stores the data acquired in S1906. In the present embodiment, job log information is acquired as the data, and stored in the job log information table that is managed by the data collection unit 504. In S1910, the data collection unit 504 changes the data acquisition status 709 of the device information acquired in S1901 to [Data Acquisition Complete], saves it, and terminates this processing. By means of the above-described operations, it is possible for the management server to efficiently collect data from multiple image forming devices according to the existence or non-existence of a power mode or a power notification function of the image forming device.

Aspects of the present invention can also be realized by a computer of a system or device (or devices such as a CPU or MPU) that reads out and executes a program recorded on a memory device to perform the functions of the above-described embodiments, and by a method, the steps of which are performed by a computer of a system or device by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-186787 filed Aug. 27, 2012, which is hereby incorporated by reference herein in its entirety.

What is claimed is:

1. A management device comprising:

a processor and a memory operatively coupled to provide:

a manager configured to manage device information which includes at least a power status and an existence or non-existence of a power status notification function of an image forming device, wherein the power status of the image forming device having the power status notification function is managed according to a notification from the image forming device using the power status notification function;

a requestor configured to transmit a response confirmation request to at least one of multiple image forming devices;

a receiver configured to receive a response from any one of the multiple image forming devices; and an acquirer configured to acquire, from the image forming device that provided the response, data that shows an operational status of an image forming device by sending a data acquisition request different from the response confirmation request to the image forming device that provided the response, wherein the device information further includes a compulsory acquisition standby status as one of pieces of status information about the data that shows the operational status of the image forming device, wherein the requestor does not transmit the response confirmation request in a case where the power status managed by the manager is a power conservation mode for the image forming device having the power status notification function, wherein, in a case where the requestor does not transmit the response confirmation request to the image forming device which the power status managed by the manager is the power conservation mode and the status information of the image forming device indicates the compulsory acquisition standby status, the acquirer sends the data acquisition request to the image forming device, wherein the requestor transmits the response confirmation request to the image forming device in a case where the power status managed by the manager is a standby mode for the image forming device having the power status notification function, and wherein the acquirer does not send the data acquisition request to the image forming device which does not perform a response for the response confirmation request by the requestor.

2. The management device according to claim 1, wherein the requestor further transmits the response confirmation request to the image forming device in a case where the image forming device does not have the power status notification function.

3. The management device according to claim 1, wherein the manager is configured to manage the compulsory acquisition standby status according to a specific request from an image forming device storing uncollected data.

4. The management device according to claim 1, wherein, in a case where the requestor does not transmit the response confirmation request to the image forming device which the power status managed by the manager is the power conservation mode and the status information of the image forming device does not indicate the compulsory acquisition standby status, the acquirer does not send the data acquisition request to the image forming device.

5. The management device according to claim 1, wherein the requestor does not transmit the response confirmation request in a case where the number of image forming devices for which the status information is acquisition standby status exceeds a prescribed number, but transmits the response confirmation request in a case where it is the prescribed number or less.

6. The management device according to claim 5, wherein, when an image forming device that is among the multiple image forming devices and that is in the response confirmation standby status and that is a subject of the data acquisition, the requestor does not transmit the response confirmation request in a case where the number of image forming devices for which the status information is the acquisition standby status exceeds the prescribed number, but transmits the response confirmation request in a case where it is the prescribed number or less.

7. The management device according to claim 1, wherein the device information includes information relating to a retention capacity of the image forming device, and the acquirer determines an order of priority when the data is requested according to the information relating to the retention capacity.

8. The management device according to claim 1, wherein the acquirer requests the data from the image forming device, in the case where the image forming device has the power status notification function, and the power status information received from the image forming device indicates the standby mode.

9. The management device according to claim 1, wherein data indicating an operational status of the image forming device is job log information.

10. A control method in a management device, comprising steps of:

managing device information which includes at least a power status and an existence or non-existence of a power status notification function of an image forming device, wherein the power status of the image forming device having the power status notification function is managed according to a notification from the image forming device using the power status notification function;

transmitting a response confirmation request to at least one of multiple image forming devices;

receiving a response from any of the multiple image forming devices; and acquiring, from the image forming device that provided the response, data indicating an operational status of an image forming device by sending a data acquisition request different from the response confirmation request to the image forming device that provided the response, wherein the device information further includes a compulsory acquisition standby status as one of pieces of status information about the data that shows the operational status of the image forming device, wherein, in the transmitting step, the response confirmation request is not transmitted in a case where the power status managed as the device information is a power conservation mode for the image forming device having the power status notification function, wherein, in the transmitting step, in a case where the response confirmation request is not transmitted to the image forming device which the power status managed by the manager is the power conservation mode and the status information of the image forming device indicates the compulsory acquisition standby status, the data acquisition request is sent, in the acquiring step, to the image forming device, wherein, in the transmitting step, the response confirmation request is transmitted to the image forming device in a case where the power status managed in the managing step is a standby mode for the image forming device having the power status notification function, and wherein, in the acquiring step, the data acquisition request is not sent to the image forming device which does not perform a response for the response confirmation request.

11. A non-transitory computer-readable storage medium on storing a program that when executed causes a computer to perform a control method of a management device, the method comprising steps of:

managing device information which includes at least a power status and an existence or non-existence of a power status notification function of an image forming device, wherein the power status of the image forming device having the power status notification function is managed according to a notification from the image forming device using the power status notification function;

transmitting a response confirmation request to at least one of multiple image forming devices;

receiving a response from any of the multiple image forming devices; and acquiring, from the image forming device that provided the response, data indicating an operational status of an image forming device by sending a data acquisition request different from the response confirmation request to the image forming device that provided the response, wherein the device information further includes a compulsory acquisition standby status as one of pieces of status information about the data that shows the operational status of the image forming device, wherein, in the transmitting step, the response confirmation request is not transmitted in a case where the power status managed as the device information is a power conservation mode for the image forming device having the power status notification function, wherein, in the transmitting step, in a case where the response confirmation request is not transmitted to the image forming device which the power status managed by the manager is the power conservation mode and the status information of the image forming device indicates the compulsory acquisition standby status, the data acquisition request is sent, in the acquiring step, to the image forming device, wherein, in the transmitting step, the response confirmation request is transmitted to the image forming device in a case where the power status managed in the managing step is a standby mode for the image forming device having the power status notification function, and wherein, in the acquiring step, the data acquisition request is not sent to the image forming device which does not perform a response for the response confirmation request.

* * * * *